(12) United States Patent
Ding et al.

(10) Patent No.: US 8,378,746 B2
(45) Date of Patent: Feb. 19, 2013

(54) VOLTAGE-MODE LINE DRIVING CIRCUIT HAVING ADAPTIVE IMPEDANCE MATCHING

(75) Inventors: Xuexin Ding, Shanghai (CN); Zhongyuan Chang, Shanghai (CN)

(73) Assignee: Integrated Device Technology, inc, San Jose, CA (US)

( * ) Notice: Subject to any disclaimer, the term of this patent is extended or adjusted under 35 U.S.C. 154(b) by 1257 days.

(21) Appl. No.: 12/218,374

(22) Filed: Jul. 11, 2008

(65) Prior Publication Data

US 2010/0007641 A1 Jan. 14, 2010

(51) Int. Cl.
*H03F 3/45* (2006.01)
*H03F 1/36* (2006.01)
*H04M 9/00* (2006.01)
*H04M 7/04* (2006.01)

(52) U.S. Cl. .................... 330/257; 330/102; 379/398

(58) Field of Classification Search .......... None
See application file for complete search history.

(56) References Cited

U.S. PATENT DOCUMENTS

| | | | | |
|---|---|---|---|---|
| 2004/0113695 | A1* | 6/2004 | Harris | 330/285 |
| 2004/0201416 | A1* | 10/2004 | Wyers et al. | 330/2 |
| 2004/0232980 | A1* | 11/2004 | Jantzi et al. | 330/51 |
| 2005/0094736 | A1* | 5/2005 | Maulik et al. | 375/257 |
| 2007/0296456 | A1* | 12/2007 | van der Goes et al. | 326/30 |
| 2008/0101592 | A1* | 5/2008 | Wu et al. | 379/399.01 |
| 2009/0115769 | A1* | 5/2009 | Jo et al. | 345/212 |

* cited by examiner

*Primary Examiner* — Simon Sing
*Assistant Examiner* — Jeffrey Lytle
(74) *Attorney, Agent, or Firm* — Hayes and Boone LLP

(57) ABSTRACT

A voltage-mode line driving circuit is provided. The voltage-mode line driving circuit includes a driving circuit, the driving circuit receiving, as an input signal, a feedback signal, and outputting an output signal. The voltage-mode line driving signal also includes an adaptive tuning circuit coupled to the driving circuit, the adaptive tuning circuit receiving as input signals the feedback signal and the output signal and adaptively outputting a modifying signal to the driving circuit which modifies the feedback signal.

17 Claims, 5 Drawing Sheets

VOLTAGE-MODE LINE DRIVING CIRCUIT HAVING ADAPTIVE IMPEDANCE MATCHING

BACKGROUND

1. Technical Field

Embodiments consistent with the present invention are related to a circuit for driving a line, and, in particular, a voltage-mode line driving circuit having adaptive impedance matching.

2. Discussion of Related Art

In today's communication industry, coaxial and twisted-pair cables are widely used in transmitting E1/T1 data due to their practicability and low cost. However, as more media, particularly streaming video and audio, are transmitted over E1/T1 lines, traditional transceiver products are encountering increasing technical difficulties in transmitting and receiving the greater bandwidths of data over greater distances. For example, a line driver which is typically used to improve the transmission reliability, especially over long distances, may encounter problems with signal reflections as the signal is transmitted. To minimize reflections, the driver's output impedance should be equal to, or matched with, the characteristic impedance of the line, and be independent of process, temperature, and load variations. Moreover, the output waveform shape must meet ITU template standards.

Traditionally, there have been two ways to implement impedance matching for line drivers. FIG. 1A shows a line driver having impedance matching according to a first design. As shown in FIG. 1A, matching resistors 10 and 20 are serially connected to a voltage amplifier output 30, used to drive a voltage over line 40 which is coupled to load 50, through a transformer. However, the source voltage and power of a circuit using impedance matching as shown in FIG. 1A is consumed by matching resistor 10 or 20. Due to the voltage and power drop, a higher output voltage is required at the source end to provide a signal at the far end of line 40 with an acceptable voltage amplitude. The higher output voltage requirements make such a circuit difficult to incorporate into modern circuits which strive for smaller size, lower voltage, and lower power.

FIG. 1B shows a line driver having impedance matching according to a second design. As shown in FIG. 1B, a matching resistor 60 is connected in parallel to a current amplifier output 70. The circuit shown in FIG. 1B uses a current output to eliminate the problem that signal voltage amplitude is restricted by the source voltage, as illustrated in FIG. 1A. Although the circuit shown in FIG. 1B may be able to use a lower voltage supply (for example, 3.3 V), the current and power is similarly consumed by matching resistor 60.

With advancements in sub-micrometer processing and fabrication techniques, a C-mode line driver has been developed and widely used. It uses a current-mode signal as a driving signal and also has internal impedance matching. The C-mode line driver successfully overcomes some of the problems, such as, for example, large power consumption and power supply voltage restriction, that occur in the traditional line drivers shown in FIGS. 1A and 1B.

FIG. 2A illustrates a schematic of a conventional C-mode line driver circuit 200. As shown in FIG. 2A, the input voltage $V_{in}$ is converted to a current output $I_o$ via a transconductance amplifier 202, which drives current output $I_o$ through resistor 206 creating an output voltage $V_{out}$. Output voltage $V_{out}$ is sampled and then fed back to the input side of another transconductance amplifier 204, which outputs a feedback current $I_{fb}$ accordingly. By sampling output voltage $V_{out}$ to output feedback current $I_{fb}$ which is fed back to transconductance amplifier 204, the input impedance is matched to the output impedance.

As shown in FIG. 2A, it is expected that an output voltage increment, denoted v will also cause a current variation, denoted i. This output current variation i is caused by, and depends on, the internal resistance $R_{204}$ of transconductance amplifier 204. According to Ohm's Law, $$v = i \times R_{204}.$$

Moreover, the output impedance $Z_{out}$ of circuit 200 is given by:

$$Z_{out} = v \div i = R_{204}.$$

Thus, the active output impedance is $R_{204}$.

FIG. 2B is a schematic showing the circuit implementation of the C-mode line driver circuit 200 shown in FIG. 2A. As shown in FIG. 2B, transconductance amplifier 202 is achieved in the circuit through resistor 208 and 1:N current mirror 210. Moreover, the internal resistance of transconductance amplifier 204 is equivalent to the inverse of the resistance of resistor 212. Based on these relationships, the following show that the output impedance $Z_{out}$ of circuit 200 depends on the resistance of resistor 208.

$$R_{202} = \frac{N+1}{R_{208}} \quad R_{204} = \frac{1}{R_{212}};$$

$$i = \frac{v}{R_{208}} + \frac{v}{R_{208}} \times N;$$

$$Z_{out} = \frac{v}{i} = \frac{R_{208}}{1+N}.$$

Because resistor 208 is an on-chip resistor, the resistance $R_{208}$ will vary with varying process conditions and varying temperatures. Accordingly a tuning circuit may be utilized for the adjustment of $Z_{out}$ to ensure that $Z_{out}$ matches an input impedance of load 206.

Conventional C-mode line drivers that successfully implement internal impedance matching eliminate the signal voltage loss or signal current loss occurring to the traditional driver shown by the circuits in FIGS. 1A and 1B, which can be as much as a −6 dB loss. Moreover, C-mode line drivers, produced using sub-micrometer processes, are able to be easily integrated as on-chip solutions.

C-mode line drivers, however, are unable to be implemented via a fully differential circuit. This is because they can only be constructed to have a dual-end output by duplicating two single-end output drivers, which leads to higher circuit complexity and higher static power consumption. Moreover, C-mode line drivers have poor common-mode suppression due to lack of a common-mode feedback circuit, which affects the transmitted signal quality. In addition, output impedance $Z_{out}$ has to be preset, and cannot be auto-tuned.

There is, therefore, a need for a driver which drives the line with a voltage-mode signal and features a simple structure with high power efficiency, better common mode rejection and the capability of adaptive impedance matching.

SUMMARY

In accordance with aspects of the present invention, there is provided a voltage-mode line driving circuit. The voltage-mode driving circuit employs adaptive impedance matching, and includes a voltage driver configured to produce a first voltage to drive a first current through a load resistance, a current sampling and feedback circuit configured to sample the first current and output a second current through a first resistance creating a second voltage, and an adaptive tuning circuit configured to sample the first voltage and the second voltage to provide an amplification signal to the current sampling and feedback circuit.

In accordance with aspects of the present invention, there is also provided a voltage-mode line driving circuit, including a driving circuit, the driving circuit receiving as an input signal a feedback signal and outputting an output signal, and an adaptive tuning circuit coupled to the driving circuit, the adaptive tuning circuit receiving as input signals the feedback signal and the output signal and adaptively outputting a modifying signal to the driving circuit which modifies the feedback signal.

It is to be understood that both the foregoing general description and the following detailed description are exemplary and explanatory only and are not restrictive of the invention. Further embodiments and aspects of the invention are described with reference to the accompanying drawings, which are incorporated in and constitute a part of this specification.

DETAILED DESCRIPTION

Reference will now be made in detail to the embodiments consistent with the present invention, examples of which are illustrated in the accompanying drawings. Wherever possible, the same reference numbers will be used throughout the drawings to refer to the same or like parts.

In accordance with aspects of the present invention, a voltage-mode driving circuit improves upon the conventional C-mode line driver. Embodiments consistent with the present invention may incorporate a circuit having a fully differential structure with common-mode feedback and adaptive impedance matching. Thus, circuits consistent with the present invention may have a simpler structure, lower power consumption, stronger common-mode suppression, and precise impedance matching.

Figure 1A:
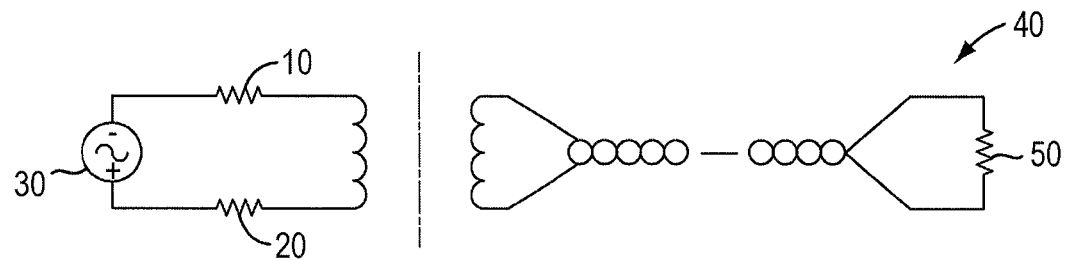
FIG. 1A shows a line driver having impedance matching according to a first design.
Figure 1B:
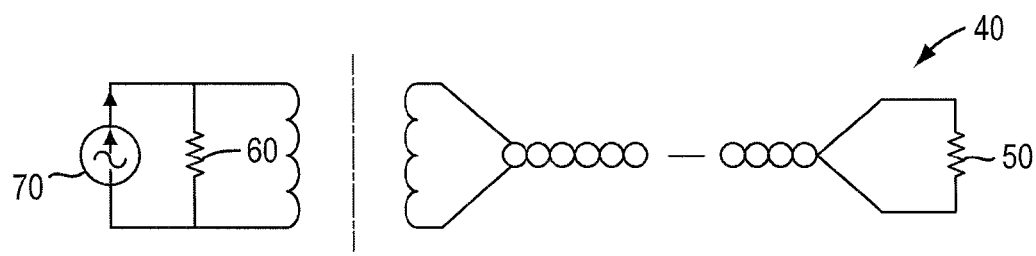
FIG. 1B shows a line driver having impedance matching according to a second design.
Figure 2A:
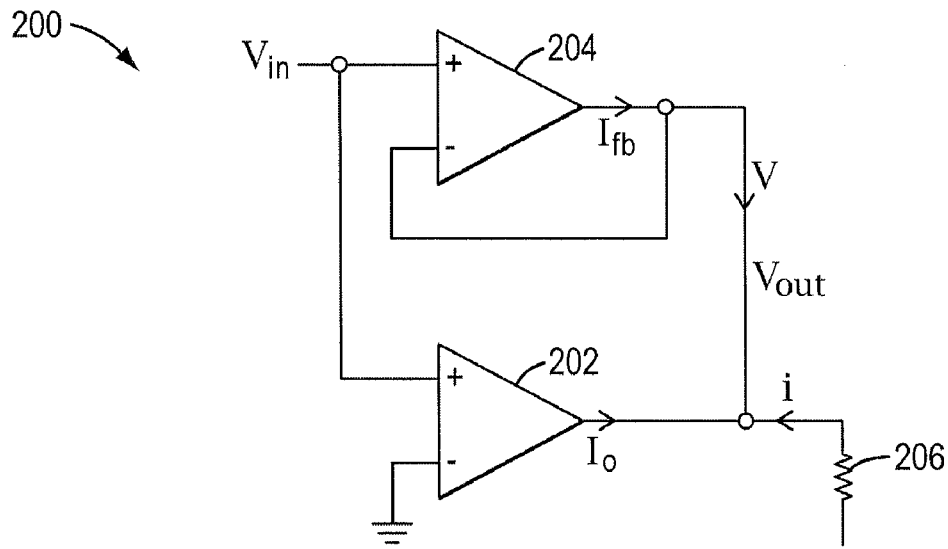
FIG. 2A illustrates a schematic of a conventional C-mode line driver.
Figure 2B:
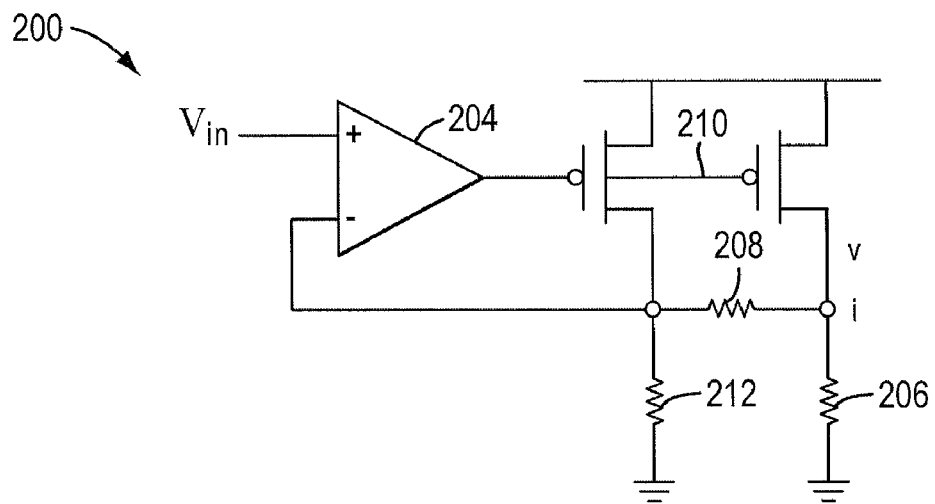
FIG. 2B is a schematic showing the circuit implementation of the C-mode line driver shown in FIG. 2A.

As shown in FIGS. 2A and 2B, above, the active impedance of the conventional C-mode driver is implemented by driving load 206 with current $I_o$, sampling output voltage $V_o$, and then feeding $V_o$ back to the input side of the driver. However, a voltage-mode driving circuit consistent with the present invention may implement internal impedance matching by outputting a voltage-mode signal, sampling the output current and feeding the output current back to the input side of the driver.

Figure 3:
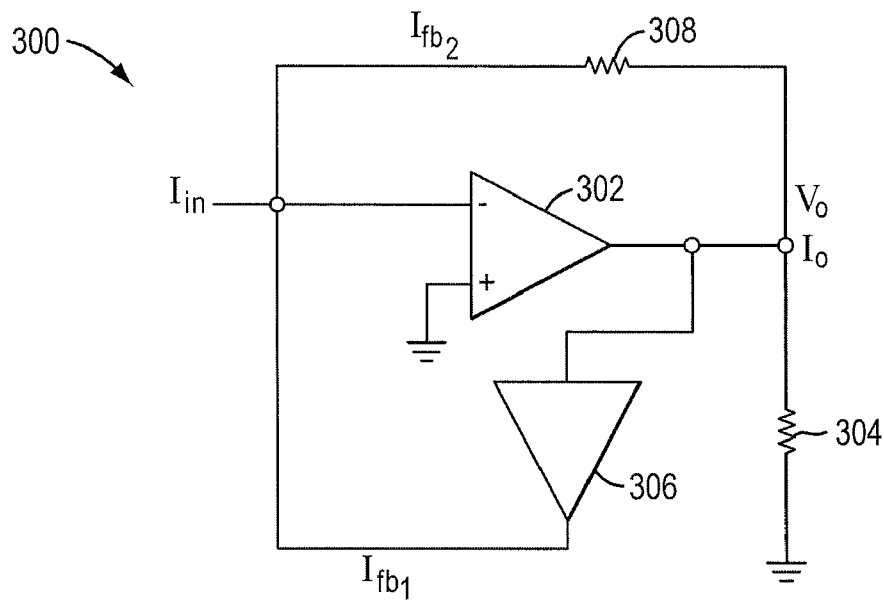
FIG. 3 is a general schematic showing a voltage-mode line driving circuit consistent with the present invention.

FIG. 3 shows a general schematic of a voltage-mode line driving circuit 300 consistent with the present invention. As shown in FIG. 3, voltage-mode line driving circuit 300 includes voltage amplifier 302 coupled to load resistance 304. Consistent with embodiments of the present invention, voltage amplifier 302 may be a transresistance, or transimpedance amplifier, which receives an input current $I_o$ and outputs an output voltage $V_o$. Load 304 has a resistance $R_{304}$, which is the input impedance of the load that voltage-mode line driving circuit 300 is connected. Load 304 will be referred to as simply "input impedance." Voltage-mode line driving circuit 300 has an output impedance $Z_{out}$ which will be referred to as simply "output impedance."

Returning to FIG. 3, voltage amplifier 302 is further coupled to a current sampling and feedback circuit including current amplifier 306. Resistor 308 is coupled between the input and output of voltage amplifier 302. Consistent with aspects of the present invention, voltage amplifier 302 outputs output voltage $V_o$ to drive an output current $I_o$ through load 304, and current sampling and feedback circuit, including current amplifier 306, samples output current $I_o$, and outputs a first feedback current $I_{fb1}$ that is proportional to $I_o$, and feeds back first feedback current $I_{fb1}$ to the input of voltage amplifier 302. As shown in FIG. 3, output voltage $V_o$ also drives a second feedback current $I_{fb2}$ through resistor 308, wherein input current $I_{in}$ includes first feedback current $I_{fb1}$ and second feedback current $I_{fb2}$.

As shown below, if circuit 300 did not have current sampling and feedback circuit 306, output voltage $V_o$ would be equal to the input current $I_{in}$ multiplied by the resistance of resistor 308. That is, $V_o$ would be equal to $I_{in} \times R_{308}$, and the output impedance would be low. Once current sampling and feedback circuit 306 is added, the output impedance depends on the gain A of current sampling and feedback circuit 306, as shown in the following equations.

$$V_0 = I_o \times A \times R_{308}$$

$$Z_{out} = \frac{V_o}{I_o} = R_{308} \times A$$

Accordingly, the output impedance of circuit 300 is $R_{308} \times A$.

Moreover, as noted above, output voltage $V_o$ is related to gain A of current sampling and feedback circuit 306. Accordingly, the following can be shown:

$$(I_{in} - (I_o \times A)) \times R_{308} = V_o$$

$$V_o = I_o \times R_{304}.$$

Moreover, if the output impedance is equal to the input impedance, the following holds true:

$$R_{304} = R_{308} \times A,$$

Then:

$$I_{in} \times R_{308} - V_o = V_o;$$

$$V_o = \frac{I_{in} \times R_{308}}{2}.$$

As shown above, output voltage $V_o$ is independent of the input impedance $R_{304}$ when output impedance $Z_{out}$ is matched to input impedance $R_{304}$.

According to aspects of the present invention, for example, as disclosed above, a voltage-mode driver consistent with the present invention may provide internal impedance matching. However, completely reflectionless transmission may still be difficult to achieve because the resistance value of resistor 308 may vary due to process conditions and temperature, and similar conditions may also cause load resistance 304 to vary. Accordingly, consistent with an embodiment of the present invention, a built-in adaptive tuning circuit can be used to vary the gain A of the current sampling and feedback circuit 306 for exact impedance matching.

Figure 4:
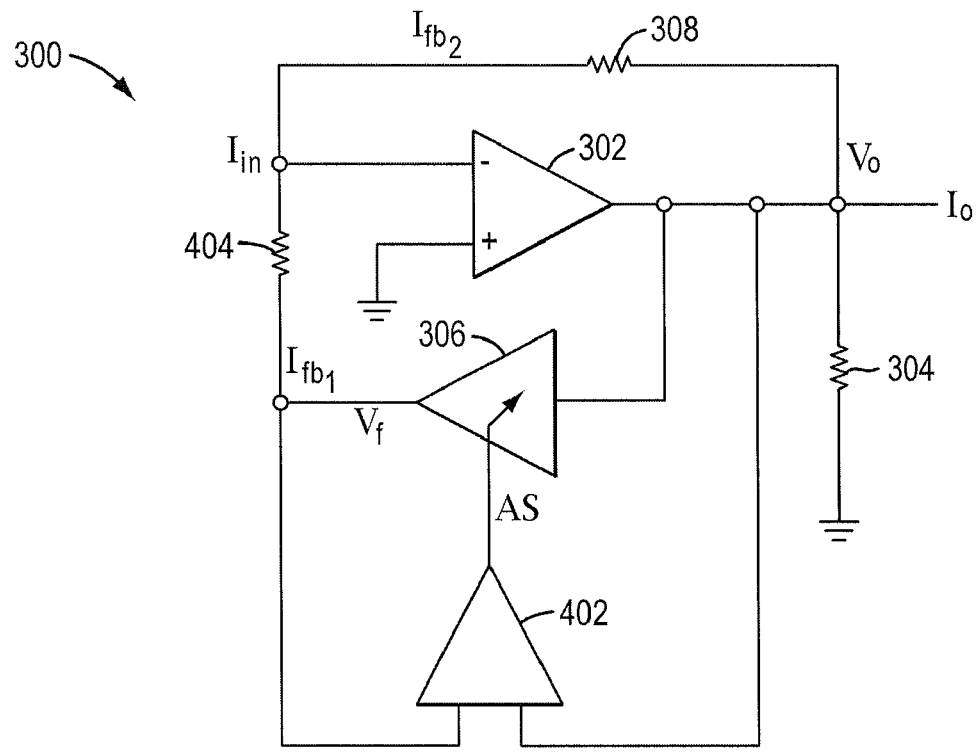
FIG. 4 is a general schematic showing a voltage-mode line driving circuit having adaptive impedance matching consistent with the present invention.

FIG. 4 is a general schematic showing a voltage-mode line driving circuit 300 having adaptive impedance matching consistent with the present invention. As shown in FIG. 4, an adaptive tuning circuit 402 is coupled to vary the gain A of current sampling and feedback circuit 306. Adaptive tuning circuit 402 is further coupled to an output of voltage amplifier 302 and an output of current sampling and feedback circuit 306. Resistor 404 is coupled between an output of current sampling and feedback circuit 306 and an input of voltage amplifier 302. According to an embodiment of the present invention, resistor 404 has the same resistance as resistor 308.

Consistent with the present invention, a signal output from current sampling and feedback circuit 306 and the voltage-mode signal output from voltage amplifier 302 are input into adaptive tuning circuit 402. Adaptive tuning circuit 402 compares the voltage $V_f$ created by driving a current output from current sampling and feedback circuit 306 through resistor 404 and output voltage $V_o$, and varies gain A of current sampling and feedback circuit 306 based on the comparison. For example, if adaptive tuning circuit 402 determines that $V_f < V_o$, adaptive tuning circuit 402 outputs an amplification signal $A_s$ to current sampling and feedback circuit 306 to increase gain A. Consistent with embodiments of the present invention, current sampling and feedback circuit 306 includes a current amplifier, and when current sampling and feedback circuit 306 receives a signal to increase gain A, the current output from current sampling and feedback circuit 306 is increased. Because the signal output from current sampling and feedback circuit 366 is the feedback signal input into voltage amplifier 302, the feedback is increased when gain A is increased. As a result of the increased feedback, output voltage $V_o$ is decreased until $V_f = V_o$, and input and output impedances are matched. Similarly, if adaptive tuning circuit 402 determines that $V_f > V_o$, adaptive tuning circuit 402 outputs amplification signal $A_s$ to current sampling and feedback circuit 306 to decrease gain A, resulting in a decreased feedback signal, and an increase in output voltage $V_o$ until $V_f = V_o$, and input and output impedances are matched. When adaptive tuning circuit determines that $V_f = V_o$, gain A is unchanged. When $V_f = V_o$, the output impedance $Z_{out}$ will be equal to the impedance of the load 304, as shown in the following equations:

$$V_f = I_o \times A \times R_{308}$$

$$V_o = I_o \times R_{304}.$$

As long as $V_f = V_o$, $$Z_{out} = A \times R_{308} = R_{304}$$

Accordingly, impedance matching is obtained.

Figure 5:
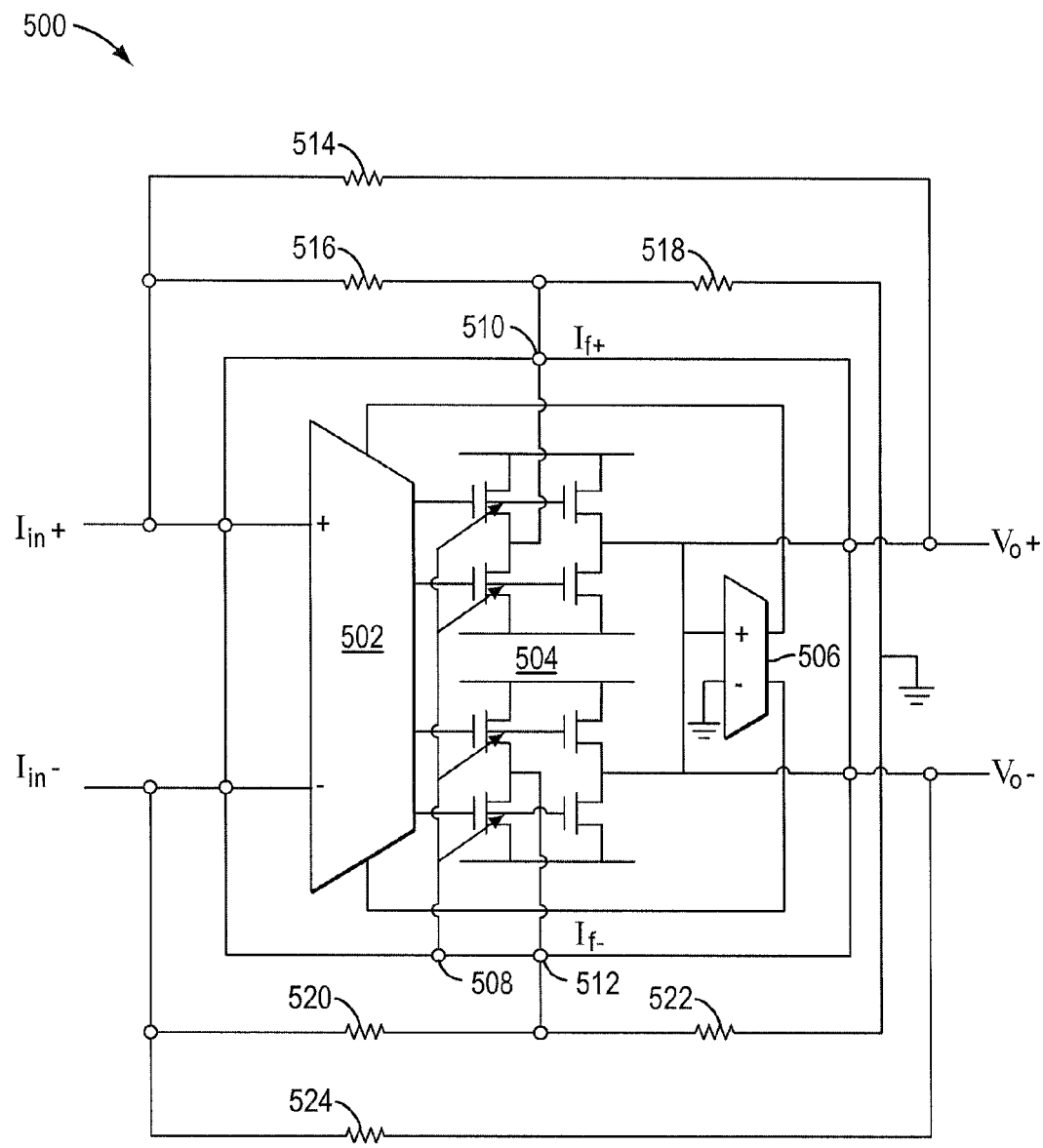
FIG. 5 is a schematic showing the circuit implementation of the voltage-mode line driving circuit consistent with the present invention.

Voltage-mode line driving circuit 300 incorporating an adaptive tuning circuit, as shown in FIG. 4, is implemented into a circuit having two primary portions: the voltage-mode line driving circuit depicted by voltage amplifier 302, and the adaptive tuning circuit depicted by amplifier 402. FIG. 5 is a schematic showing the circuit implementation of the voltage-mode line driving circuit consistent with the present invention. Voltage-mode line driving circuit 500 includes a front end amplifier 502 coupled to an array of 1:N current mirrors 504, each formed from a plurality of transistors, coupled to common mode feedback circuit 506. As shown in FIG. 5, plurality of current mirrors 504 may have a variable gain A, and the variable gain is set by a modifying or counting signal output from adaptive tuning circuit at node 508.

As shown in FIG. 5, a current mode signal having positive and negative currents $I_{in+}$ and $I_{in-}$ is input into circuit 500 and a voltage mode signal having a positive and negative voltage $V_{o+}$ and $V_{o-}$ is output from circuit 500 to drive a current $I_{f+}$ and $I_{f-}$ across a load resistance $R_L$ (not shown). The current $I_{f+}$ and $I_{f-}$ from the voltage mode output signal $V_{o+}$ and $V_{o-}$ is sampled at nodes 510 and 512, and fed back into the input of front end amplifier 502. Common mode feedback circuit 506 further feeds back a common mode signal into front end amplifier 502 to improve signal quality.

Circuit 500 further includes resistors 514, 516, 518, 520, 522, and 524, which create a load to determine the current and voltage feedbacks, and to determine the output voltage gain and output impedance. Moreover, resistors 516 and 518, and 520 and 522 each form a shunt circuit, which may reduce the number N of array of 1:N current mirrors 504 while maintaining the same current sampling ratio. Consistent with embodiments of the present invention, resistors 514, 516, 520, and 524 all may have the same resistance value.

Figure 6:
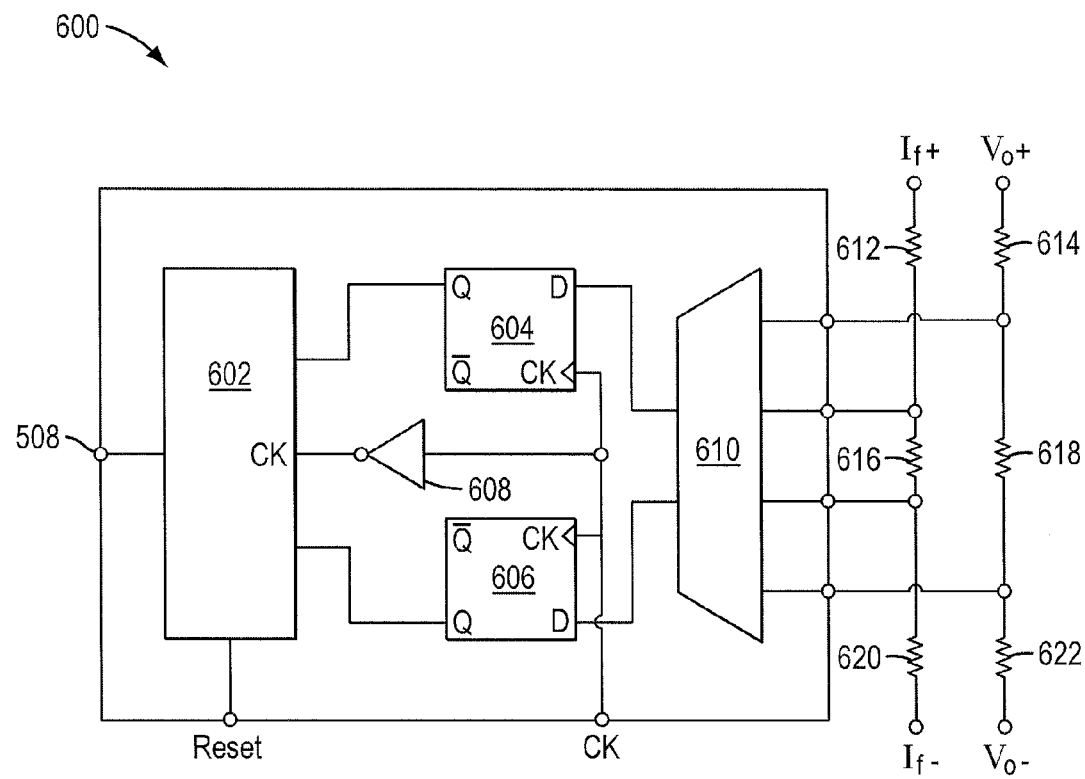
FIG. 6 is a schematic showing the circuit implementation of the adaptive tuning circuit consistent with the present invention.

FIG. 6 is a schematic showing the circuit implementation of the adaptive tuning circuit consistent with the present invention. As shown in FIG. 6, adaptive tuning circuit 600 includes a counter circuit 602 coupled to a pair of D-type flip-flops 604 and 606 and an inverter 608 for receiving inverted clock signal CK. A reset signal may also be input into counter circuit 602. In accordance with aspects of the invention, counter circuit 602 may comprise a 6-bit counter, which is sufficient to obtain a variation range of ±40% and a precision of 2%. Moreover, counter circuit 602 may be a digital counter circuit. Flip-flops 604 and 606 each include D, or data inputs, clock inputs CK, and outputs Q and inverse Q ("not Q" or $\overline{Q}$). In operation, flip-flops 604 and 606 output at Q the signal input at D on the rising edge of clock signal CK.

Flip-flops 604 and 606 are coupled to comparator 610. Positive and negative components of feedback current $I_{f+}$ and $I_{f-}$, and positive and negative components of output voltage signal $V_{o+}$ and $V_{o-}$ are sampled across voltage dividers created by resistors 612, 614, 616, 618, 620, and 622, and the resultant voltages from these signals are input into comparator 610. Comparator 610 compares the amplitudes of the voltages of the sampled signals. Based on the comparison, comparator outputs a comparison signal to flip-flops 604 and 606, which then outputs the comparison signal to counter circuit 602 on the rising edge of clock signal CK. Based on the comparison signal, counter circuit 602 outputs a modifying signal to voltage driving circuit 500 at node 508, as shown in FIG. 5. According to aspects of the invention, the modifying signal may be a count up or a count down signal, the count up signal being transmitted to increase gain A, and the count down signal being transmitted to decrease gain A.

Similar to the process described above, if comparator 610 determines that the amplitude of the voltage of the feedback signal is less than the amplitude of the voltage of the output signal ($V_f < V_o$), counter circuit 602 can output a modifying signal which will increase gain A of plurality of current mirrors 504 such that the current output from current mirror 504 and fed back into front end amplifier 502 is increased, which decreases output voltage $V_o$. Moreover, if comparator 610 determines that $V_f > V_o$, counter circuit 602 outputs a signal to array of current mirrors 504 to decrease gain A, resulting in a decreased feedback current, and an increase in output voltage $V_o$ until $V_f=V_o$. When comparator 610 determines that $V_f=V_o$, gain A is unchanged. By changing gain A to ensure that $V_f=V_o$ adaptive tuning circuit 600 is essentially equalizing the drain source voltage $V_{ds}$ of the sampling transistor and the output transistor in array of current mirrors 504.

Based on the operation of voltage-mode line driving circuit 500 and adaptive tuning circuit 600 as described above, the output impedance will equal the input impedance as adaptive tuning circuit ensures that $V_f=V_o$, as shown below. Assuming a varying current of the output signal $I_o$ and a varying voltage of the output signal $V_o$, the current of the feedback signal sampled by array of current mirrors 504 will be:

$$I_f = \frac{I_o}{N},$$

wherein $$I_f = I_{f+} - I_{f-}.$$

Current $I_f$ is then shunted through resistors 520 and 522 or 516 and 518, as shown in FIG. 5. The equations below refer to the current as shunted through resistors 516 and 518, but would apply to resistors 520 and 522 as well. The current flowing into resistor 514 will be:

$$I_{f514} = \frac{I_o}{N} \times \frac{R_{518}}{R_{516} + R_{518}}.$$

Due to inherent virtual short characteristics of front end amplifier 502, output voltage $V_o$ may be defined as:

$$V_o = I_{f514} \times R_{514} \times 2 = \frac{I_o}{N} \times \frac{R_{518}}{R_{516} + R_{518}} \times R_{514} \times 2.$$

Output impedance $Z_{out}$ may then be shown to be:

$$Z_{out} = \frac{V_o}{I_o} = \frac{2R_{514}}{N} \times \frac{R_{518}}{R_{516} + R_{518}}.$$

Because adaptive tuning circuit ensures that $V_f=V_o$, as discussed above, the following can be shown:

$$V_f=V_o, \text{ wherein } V_f=V_{f+}-V_{f-} \text{ and } V_o=V_{out+}-V_{out-}.$$

Due to inherent virtual short characteristics of front end amplifier 502, output voltage $V_o$ may be defined as:

$$V_f = \frac{I_o}{N} \times \frac{R_{518}}{R_{518} + R_{516}} \times R_{516} \times 2.$$

Further, as noted above, because the resistance values of resistor 516 and resistor 514 may be equal, the following may be obtained:

$$V_f = \frac{I_o}{N} \times \frac{R_{518}}{R_{518} + R_{516}} \times R_{514} \times 2.$$

Based on Ohm's Law, output voltage $V_o$ is equal to:

$$V_o = I_o \times R_L.$$

Based on the above equations, the following value for $R_L$ may be derived:

$$\frac{2R_{514}}{N} \times \frac{R_{518}}{R_{518} + R_{516}} = R_L.$$

Finally, based on the above, it can then be shown that $Z_{out}=R_L$ when $V_f=V_o$. Accordingly, the voltage-mode line driving circuit having the adaptive tuning circuit maintains input and output impedance matching even over variations of process conditions, temperatures, or loads.

Some embodiments consistent with the present invention may offer simpler circuit design and low power dissipation. Moreover, some embodiments consistent with the present invention may include a fully differential voltage output structure, strong anti-noise capability through common-mode feedback, and digital adaptive impedance matching with high precision and without external tuning. Such advantages may allow for consistency between the amplitudes of signals transmitted across the driven line.

Other embodiments consistent with the present invention will be apparent to those skilled in the art from consideration of the specification and practice of the invention disclosed herein. It is intended that the specification and examples be considered as exemplary only. Accordingly, the invention should only be limited by the following claims.

What is claimed is:
1. A voltage-mode line driving circuit, comprising:
a driving circuit, the driving circuit receiving, as an input signal, a feedback signal and outputting an output signal, the driving circuit comprising:
a front-end amplifier receiving the feedback signal as an amplifier input signal; and
a sampling circuit receiving the output signal from the front-end amplifier as an input, and outputting the feedback signal; and
an adaptive tuning circuit coupled to the driving circuit, the adaptive tuning circuit receiving as input signals the feedback signal and the output signal and adaptively outputting a modifying signal to the driving circuit which modifies the feedback signal by varying a gain of the sampling circuit based on a comparison of the feedback signal and the output signal.

2. The voltage-mode driving circuit of claim 1, wherein:
the sampling circuit comprises an array of current mirrors coupled to the front-end amplifier; and the driving circuit further comprises:
a common mode feedback circuit coupled to an output of the sampling circuit and an input of the front-end amplifier, and providing the feedback signal to the front-end amplifier; and
at least one shunt circuit coupled between the input of the front-end amplifier and an output of the sampling circuit.

3. The voltage-mode driving circuit of claim 2, wherein the adaptive tuning circuit comprises:
a comparator circuit, the comparator circuit receiving the feedback signal and the output signal as comparator input signals and outputting a comparison signal based on the comparison of the feedback signal and the output signal;

a counter circuit coupled to the comparator circuit and coupled to the sampling circuit, the counter circuit receiving a clock signal as a counter input signal, receiving the comparison signal output from the comparator circuit as a data input signal.

4. The voltage-mode driving circuit of claim 3, wherein:
the counter outputs the modifying signal to the sampling circuit, the modifying signal changing depending on the comparison signal.

5. The voltage-mode driving circuit of claim 4, wherein:
the gain of the sampling circuit is varied such that the sampling circuit increases a magnitude of the feedback signal when the feedback signal is less than the output signal and decreases the magnitude of the feedback signal when the feedback signal is greater than the output signal.

6. The voltage-mode driving circuit of claim 4, wherein when the feedback signal is equal to the output signal, an input impedance of a load coupled to the voltage-mode driving circuit equals an output impedance of the amplifier.

7. The voltage-mode driving circuit of claim 3, wherein the adaptive tuning circuit further comprises:
at least one flip-flop coupled between the counter circuit and the comparator circuit;
a first voltage divider coupled between the input current and the comparator; and
a second voltage divider coupled between the output voltage and the comparator.

8. The voltage-mode driving circuit of claim 3, wherein the counter circuit comprises a digital 6-bit counter.

9. The voltage-mode driving circuit of claim 2, wherein the output signal is a current driven through a load coupled to the amplifier, and the sampling circuit receives the output signal by sampling the current.

10. A voltage-mode line driving circuit having adaptive impedance matching, comprising:
a voltage driver configured to produce a first voltage to drive a first current through a load resistance;
a current sampling and feedback circuit comprising a current amplifier having a variable gain, the current sampling and feedback circuit configured to sample the first current and output a second current through a first resistance creating a second voltage; and
an adaptive tuning circuit configured to sample the first voltage and the second voltage to provide an amplification signal to the current sampling and feedback circuit, the amplification signal varying the gain of current amplifier being based on a comparison of the first voltage and the second voltage.

11. The voltage-mode line driving circuit of claim 10, wherein:
the second current is an input of the voltage driver.

12. The voltage-mode line driving circuit of claim 10, wherein the variable gain of the current amplifier remains constant when the first voltage equals the second voltage.

13. The voltage-mode line driving circuit of claim 10, wherein:
the amplification signal increases the variable gain of the current amplifier when the first voltage is greater than the second voltage; and
the amplification signal decreases the variable gain of the current amplifier when the first voltage from the voltage amplifier circuit is less than the second voltage.

14. The voltage-mode line driving circuit of claim 11, wherein:
the second current is increased when the first voltage is greater than the second voltage; and
the second current is decreased when a voltage from the voltage amplifier circuit is less than the voltage of the feedback signal.

15. The voltage-mode line driving circuit of claim 14, wherein:
the first voltage decreases when the variable gain increases; and
the first voltage increases when the variable gain decreases.

16. The voltage-mode line driving circuit of claim 11, further comprising:
a second resistance coupled between the output of the voltage amplifier circuit and the input of the voltage amplifier circuit; and
wherein the first resistance is coupled between the output of the current amplifier and the input of the voltage amplifier circuit.

17. The voltage-mode line driving circuit of claim 11, wherein:
the line driving circuit has an output impedance;
the load has an input impedance; and
when the first voltage equals the second voltage, the output impedance is equal to the input impedance.

* * * * *